United States Patent [19]

Bradshaw et al.

[11] Patent Number: 5,177,463
[45] Date of Patent: Jan. 5, 1993

[54] METHOD OF AND APPARATUS FOR MONITORING OPERATION OF A CATALYTIC CONVERTER

[75] Inventors: Benjamin J. Bradshaw, Solihull; Russell W. Jones, Stratford; David Williams, Kingsbury, all of England

[73] Assignee: Lucas Industries public limited company, England

[21] Appl. No.: 655,342

[22] Filed: Feb. 14, 1991

[30] Foreign Application Priority Data

Feb. 14, 1990 [GB] United Kingdom ............... 9003316

[51] Int. Cl.⁵ .............................................. B60Q 1/00
[52] U.S. Cl. .................................... 340/438; 60/274; 60/277; 340/439
[58] Field of Search ............... 340/438, 439, 449, 595; 364/431.05, 431.06; 60/277, 274

[56] References Cited

U.S. PATENT DOCUMENTS

| 3,882,451 | 5/1975 | Fujishiro | 340/499 |
| 3,962,866 | 6/1976 | Neidhard | 60/277 |
| 3,969,932 | 7/1976 | Rieger et al. | 73/118 |
| 4,315,243 | 2/1982 | Calvert, Sr. | 340/438 |
| 4,338,511 | 6/1982 | Six | 340/589 |
| 4,389,993 | 6/1983 | Long | 123/421 |
| 5,060,473 | 10/1991 | Nakagawa | 60/277 |

FOREIGN PATENT DOCUMENTS 0236659 9/1987 European Pat. Off. ............ 60/277

Primary Examiner—Jin F. Ng
Assistant Examiner—Christine K. Oda
Attorney, Agent, or Firm—Staas & Halsey

[57] ABSTRACT

Sensors measure the temperatures of exhaust gas upstream and downstream of a catalytic converter for internal combustion engine exhaust gas. The difference between the temperatures is multiplied by the rate of mass flow of exhaust gas and the result is integrated or low pass filtered to provide a measure of converter operation. Alternatively, the multiplication is omitted and the difference between the temperatures is integrated or filtered. Thus, the performance of the catalytic converter is monitored by evaulating the difference in the heat supplied to the catalytic converter and the heat removed from the catalytic converter by the exhaust gas.

14 Claims, 4 Drawing Sheets

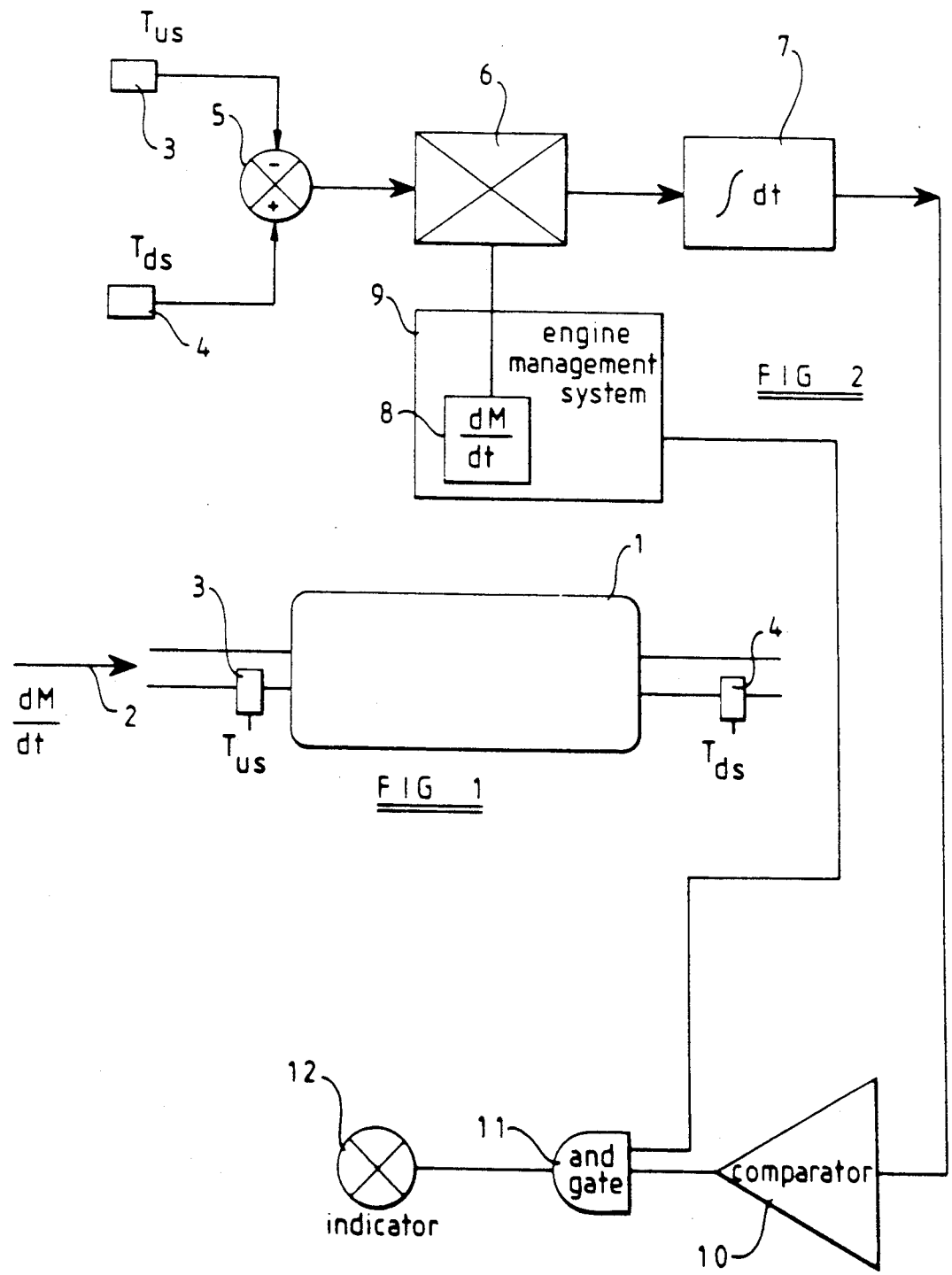

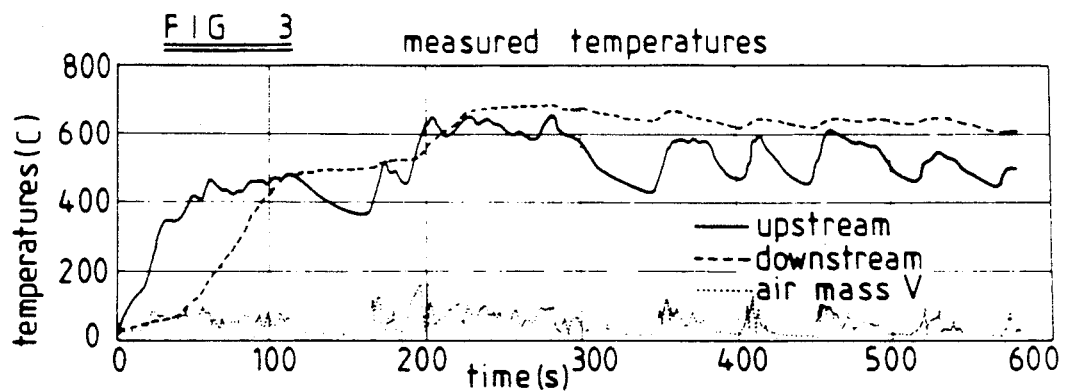
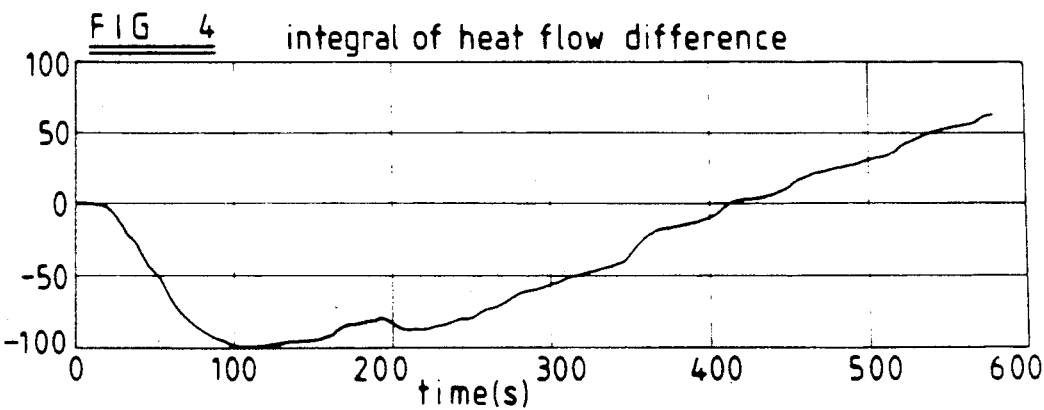
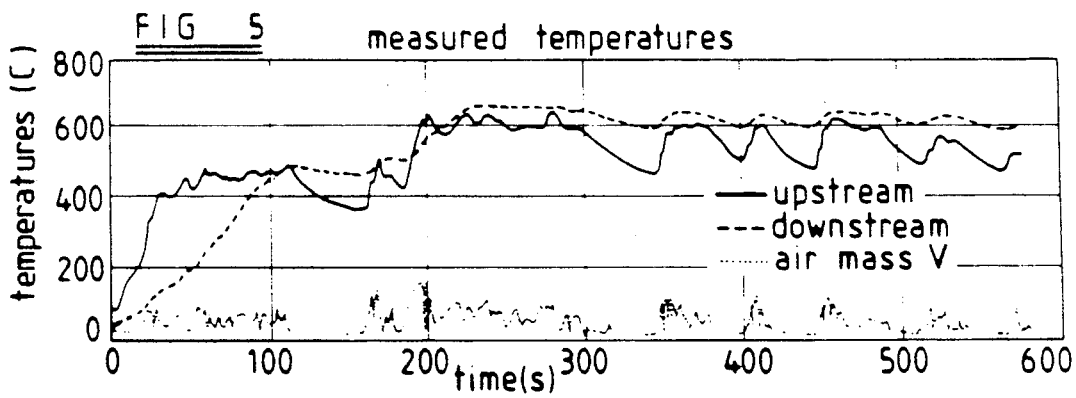
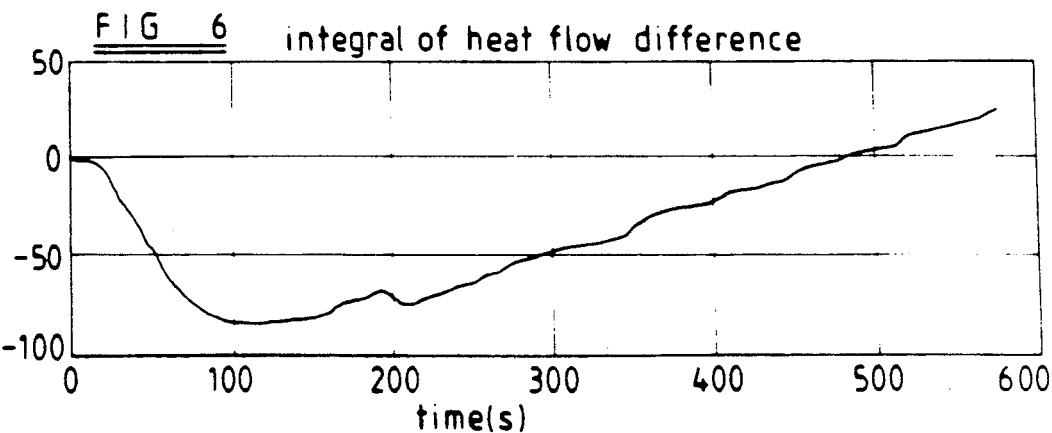

METHOD OF AND APPARATUS FOR MONITORING OPERATION OF A CATALYTIC CONVERTER

The present invention relates to a method of and an apparatus for monitoring the operation of a catalytic converter.

In order to meet increasingly stringent restrictions on the emissions of certain gases by automotive internal combustion engines, it is common nowadays for the exhaust systems of such engines to include catalytic converters. The exhaust gas from the engine passes through such converters and pollutant gas constituents are converted into less undesirable gases by the catalyst within the converter for venting to the atmosphere. In the case of so-called "two-way catalytic converters", unburnt and partially burnt hydrocarbons are converted to water and carbon dioxide and carbon monoxide is converted to carbon dioxide by oxidation. In the case of so-called "three-way converters" the catalyst performs the additional conversion of nitrogen oxides into nitrogen and oxygen by chemical reduction.

The catalyst within such converters has a limited lifetime so that the efficiency of the converter deteriorates with age and use. Also the catalyst can be degraded or "poisoned" by the presence of some pollutants, such as lead compounds, in the exhaust gas. It is also possible for the converters to be damaged during use, for instance by fracturing causing leaks to the atmosphere of exhaust gas. For these reasons, it is desirable to monitor the performance of catalytic converters and, in some legislatures, this is becoming a statutory requirement.

It has been proposed, for instance in U.S. Pat. No. 3882451 and U.S. Pat. No. 4315243, to monitor the performance of a catalytic converter by measuring the temperature difference between exhaust gas entering the converter and exhaust gas leaving the converter. In the case of an efficient converter, the chemical reactions taking place within the converter generate heat so that the temperature of exhaust gas leaving the converter should be greater than the temperature of exhaust gas entering the converter. The temperature difference is thus taken as an indication of the efficiency of operation of the converter such that, if the temperature difference is less than a threshold value, the converter is indicated as being inefficient or beyond its working life. However, problems can arise with this technique because the temperature difference can fall, and even become negative, for an efficient converter during certain operating conditions of an internal combustion engine. For instance, when a throttle controlling the admission of a combustible mixture to the engine is opened, the temperature of exhaust gas entering the converter can rise dramatically but, because of thermal lags, the temperature of exhaust gas leaving the converter rises more slowly. This can result in an indication of incorrect operation of a converter which is actually operating efficiently.

Similar problems can occur during other modes of operation of the engine giving rise to spurious or transient temperature differences which are detected as indicating inefficient operation of the converter.

According to a first aspect of the invention, there is provided a method of monitoring operation of a catalytic converter for exhaust gas of an internal combustion engine, comprising the steps of measuring the entry temperature of exhaust gas entering the converter, measuring the exit temperature of exhaust gas leaving the converter, forming the difference between the exit temperature and the entry temperature, and subjecting the difference to processing having an integral term to provide a measure of converter operation.

According to a second aspect of the invention, there is provided an apparatus for monitoring operation of a catalytic converter for exhaust gas of an internal combustion engine, comprising a first temperature sensor for measuring the entry temperature of exhaust gas entering the converter, a second temperature sensor for measuring the exit temperature of exhaust gas leaving the converter, means for forming the difference between the exit temperature and the entry temperature, and means for processing the difference including an integral term to provide a measure of operation of the converter.

The processing may amount to integrating the difference or may include low pass filtering which has an integral term in the transfer function.

It has been found that, by integrating or low pass filtering the temperature difference across the converter, the effects of spurious temperature changes are avoided and the efficiency of operation of the converter can be reliably indicated. The measure of converter operation can be used for various purposes. For instance, a visible or audible warning may be given to a vehicle driver when the measure remains below a threshold level so as to alert the driver to the relatively poor condition of the converter. The measure of converter operation may be stored for access to service personnel.

Preferably, the rate of mass flow of exhaust gas is measured and is used in the integration. For instance, the integration may be performed on the product of the temperature difference and the rate of mass flow. The integration may be performed continuously or may be performed for a predetermined time period or for the flow of a predetermined mass of exhaust gas through the converter.

The measure of converter operation may be compared with a threshold value such that an indication of a worn or damaged catalytic converter is provided when the measure of converter operation is less than the threshold value. This provides a reliable indication that the chemical action within the converter has fallen to a level which is too low and is therefore causing insufficient heating of the exhaust gas passing through the converter.

In order to avoid the effects of starting an engine from cold or for varying operating conditions of the engine, the monitoring of the catalytic converter may be limited to specified times or conditions, for instance operation of the engine at substantially constant engine speed, after a predetermined time from initially starting the engine, or after the engine has reached a range of normal operating temperatures.

According to a third aspect of the invention, there is provided a method of monitoring operation of a catalytic converter for exhaust gas of an internal combustion engine, comprising measuring the difference between heat removed from the converter by exhaust gas and heat supplied to the converter by exhaust gas.

According to a fourth aspect of the invention, there is provided an apparatus for monitoring operation of a catalytic converter for exhaust gas of an internal combustion engine, comprising means for determining the difference between heat removed from the converter by exhaust gas and heat supplied to the converter by exhaust gas.

By measuring the "heat balance" so as to ascertain the heating effect caused by chemical reactions within the catalytic converter over a period of time, a reliable measure of the efficiency of operation of the converter can be obtained which is substantially insensitive to spurious or transient changes in heat flow caused by variations in operation of the internal combustion engine. A measure of inefficient operation is provided when the average rate of heat production caused by chemical reactions within the converter falls below a threshold value corresponding to the limit of efficient operation.

It is thus possible to provide a reliable measure of operation of a catalytic converter which is substantially immune to the effects of varying conditions of engine operation and other interfering factors. Failure or expiry of the life of the converter can therefore be reliably monitored which, in turn, allows the full working life of a converter to be exploited without premature replacement while ensuring that exhaust gas pollutants are maintained within acceptable or statutory limits.

The invention will be further described, by way of example, with reference to the accompanying drawings, in which:

FIG. 1 illustrates an arrangement of temperature sensors for a catalytic converter in an exhaust system of an automotive vehicle;

FIG. 2 is a block schematic diagram of a converter monitor constituting an embodiment of the present invention;

FIG. 3 is a graph showing temperatures in degrees centigrade against time in seconds measured by the sensors in FIG. 1 and showing, at the bottom of the graph, a curve representing the rate of mass flow of exhaust gas through the converter;

FIG. 4 is a graph illustrating the integral of heat flow difference against time in seconds with the time axis corresponding to that of FIG. 3;

Figure 7:
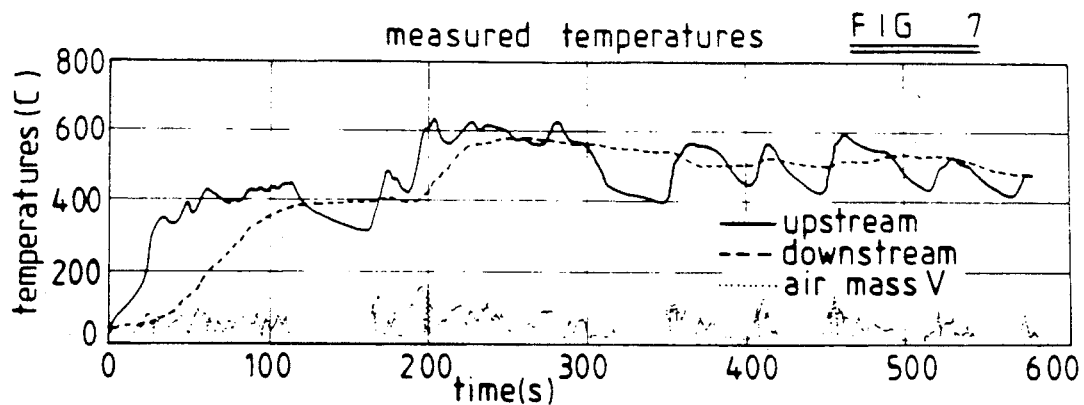
Figure 8:
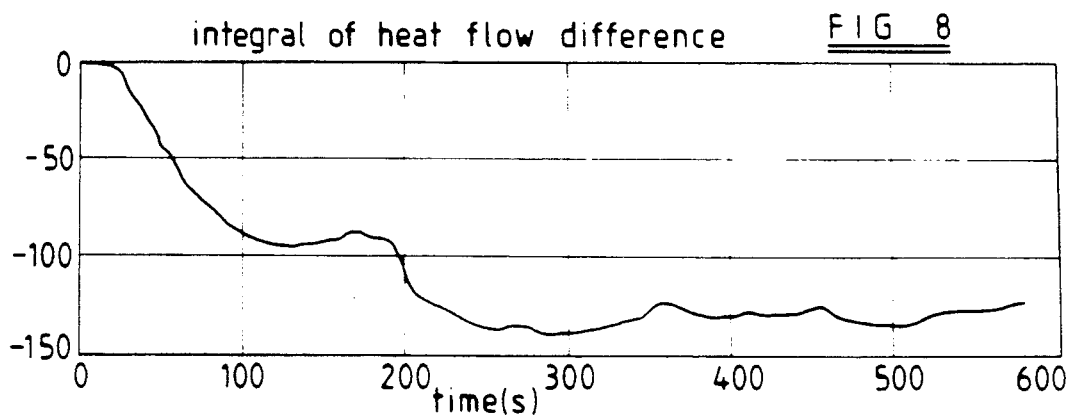
Figure 9:
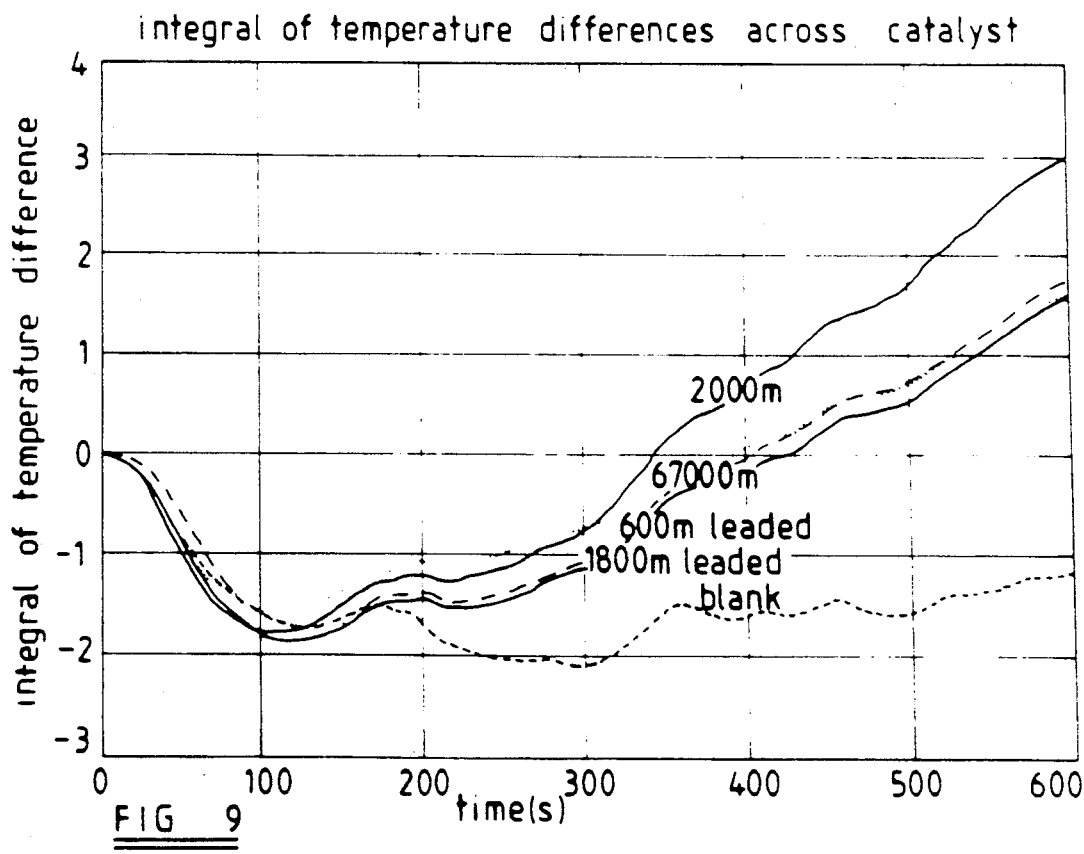
Figure 10:
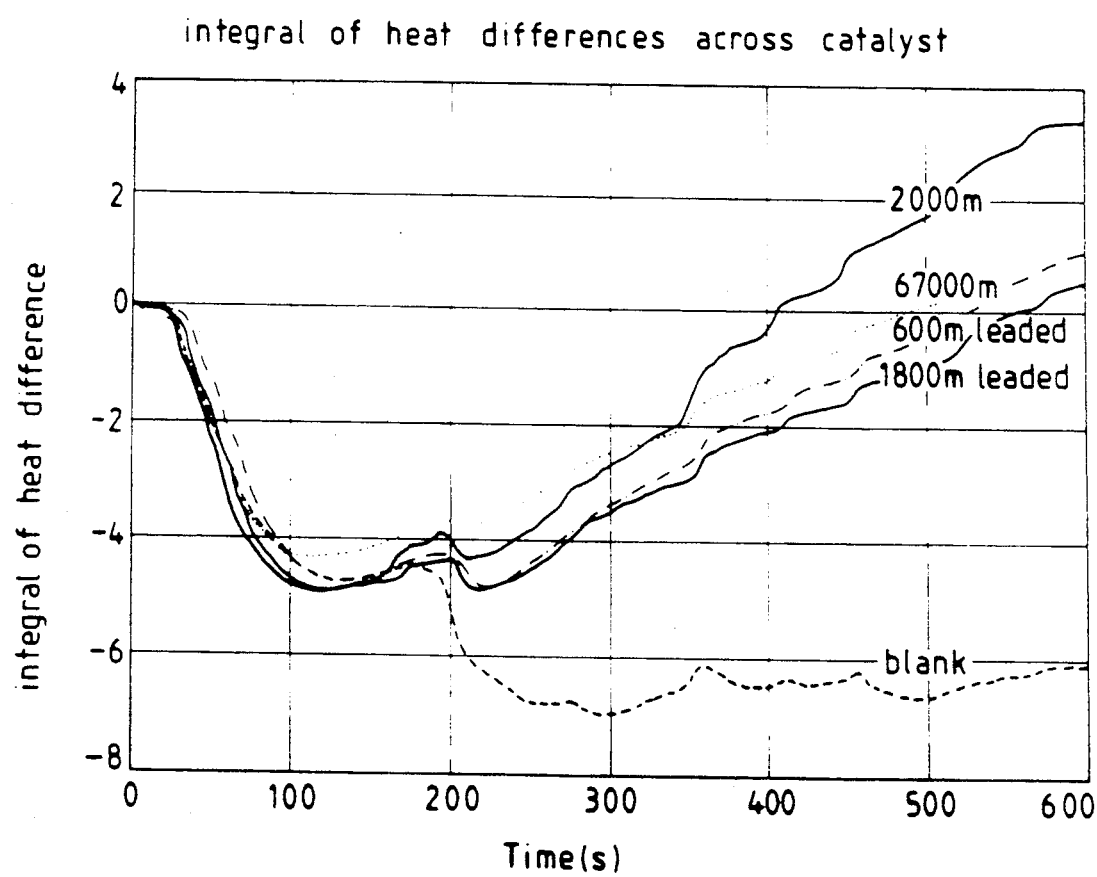

FIGS. 5 and 6 correspond to FIGS. 3 and 4, respectively, for a worn but usable catalytic converter;

FIG. 7 and 8 correspond to FIGS. 3 and 4, respectively, for a converter which is identical in construction to the converter whose performance is illustrated in FIGS. 3 and 4 but which does not contain any catalyst;

FIG. 9 illustrates the performance of several different converters in terms of the integral of temperature difference with respect to time in seconds; and FIG. 10 illustrates the integrals of heat difference for the same converters as FIG. 9 against a corresponding time axis.

FIG. 1 shows a catalytic converter 1 connected in the exhaust system of an automotive internal combustion engine and receiving exhaust gas from the engine in the direction indicated by arrow 2, the rate of flow of exhaust gas mass being indicated by dM/dt. The upstream temperature $T_{us}$ of the exhaust gas entering the converter 1 is measured by means of a temperature sensor 3. The downstream temperature $T_{ds}$ of exhaust gas leaving the converter 1 is measured by a temperature sensor 4.

The temperature sensors 3 and 4 are connected to the subtracting and non-subtracting inputs of a subtracter 5 which forms a temperature difference signal. The temperature difference signal is supplied to a first input of a multiplier 6 whose second input receives a signal representing the rate of mass flow of exhaust gas dM/dt. The mass flow rate signal dM/dt is supplied from a fuel injection system 8 which measures or calculates, at least approximately, the rate of mass flow or a parameter from which this can easily be derived. The fuel injection system forms part of an engine management system 9 which controls operation of the internal combustion engine. The multiplier 6 thus provides an output signal which represents the product of the measured temperature difference and the rate of mass flow, and this output signal is integrated with respect to time by an integrator 7.

As is immediately apparent, this integration is equivalent to integrating the temperature difference with respect to exhaust gas mass, which in turn is equivalent to forming the integral of heat difference between heat supplied to the converter by exhaust gas and heat removed from the converter by exhaust gas.

FIGS. 3 and 4 illustrate the performance of an efficient catalytic converter as measured by the monitor illustrated in FIGS. 1 and 2. The full line curve in FIG. 3 illustrates the up-stream temperature as measured by the sensor 3 whereas the broken line illustrates the downstream temperature as measured by the sensor 4 for a period of approximately 600 seconds following starting from cold of an engine. The chain dot curve at the bottom of this graph illustrates the relative air mass flow rate, for instance corresponding to a predetermined program of engine operation.

During the initial warm up phase until approximately 220 seconds after starting the engine, the upstream temperature fluctuates somewhat whereas the downstream temperature progressively increases. For much of this period, the upstream temperature exceeds the downstream temperature. This is caused by heat being absorbed in the converter from exhaust gas as the exhaust system warms up. During this phase, the catalyst is not hot enough to begin the chemical reactions and therefore contributes little or nothing to the heat removed from the converter by the exhaust gas.

Once the warm-up phase of operation of the engine has been completed, the downstream temperature remains higher than the upstream temperature for the particular cycle of engine operations illustrated. In fact, the upstream temperature fluctuates over a substantial range, depending on the actual mode of operation of the engine, whereas the downstream temperature is somewhat buffered from the effects of the upstream temperature variation and remains relatively stable. The higher temperature of the exhaust gas leaving the converter compared with the gas entering the converter is caused by the production of heat by the catalyst during the chemical reactions which, for instance, oxidise hydrocarbons and carbon monoxide into water and carbon dioxide and reduce nitrogen oxides into nitrogen and oxygen in the case of a three-way converter.

FIG. 4 illustrates the integral of heat flow difference for an efficient catalytic converter. During the initial warm-up phase, heat is removed from the exhaust gas so as to heat up the catalytic converter to its working temperature. However, once the working temperature has been achieved, the catalytic converter supplies heat to the exhaust gas. The curve of FIG. 4 therefore shows a continuing upward trend from a time of approximately 200 seconds and this indicates that the catalytic converter is operating efficiently.

The curves of FIGS. 5 and 6 correspond to those of FIGS. 3 and 4, respectively, for a catalyst which is worn but which is still operating at acceptable efficiency. In this case, the curve in FIG. 6 representing the integral of heat flow difference shows the same continuously rising trend as that of FIG. 4, but with a reduced slope indicating that the rate of heat production by the catalyst is lower than in the case of the relatively efficient converter whose operation is illustrated in FIG. 4.

FIGS. 7 and 8 illustrate operation of a converter which is identical to those whose operation is illustrated in FIGS. 3 to 6, for instance in terms of heat capacity and resistance to gas flow, but in which there is no active catalyst. Thus, as shown in FIG. 7, the temperatures measured upstream and downstream of the converter are essentially the same, the upstream temperature fluctuating rather more than the downstream temperature, whose temperature variations are smoothed by the thermal capacity of the converter. As shown in FIG. 8, heat is removed from the exhaust gas while the converter is heating up to normal operating temperature and, once this has been achieved, there is virtually no heat input or output through the converter. Thus, after a time of approximately 250 seconds, the curve of FIG. 8 is substantially horizontal and does not show the rising trends illustrated in FIGS. 4 and 6.

Although the heat flow difference integral output signal provided by the integrator 7 may be used without further processing to indicate the state of the catalytic converter, there are various other possibilities. For instance, as shown in FIG. 2, a comparator 10 compares the output signal with a fixed threshold level continuously so as to indicate expiry or failure of the catalyst when little or no heat is being supplied to the exhaust gas in the converter. Such an arrangement is sensitive only to catalytic converters which have failed completely or almost completely, or are well beyond their useful life and may well have been operating for a considerable time such that exhaust emissions have exceeded permissible values. The comparator 10 therefore preferably compares the slope of the heat flow difference integral with a predetermined slope, for instance by measuring the time taken for the integral to rise from a first predetermined value to a second predetermined value and comparing this with a threshold time or by measuring the change in value of the integral over a predetermined time period and comparing this with a threshold value. As shown in FIGS. 4 and 6 which illustrate operation of typical converters, the rising trend of the curve is monotonic and relatively smooth, so that the slope can be compared with a predetermined threshold slope with a high degree of sensitivity and reliability.

FIG. 2 shows an AND gate 11 whose first input is connected to the output of the comparator 10 and whose second input receives an enable signal from the engine management system 9. The enable signal is produced after the engine has reached normal operating temperature, and may be produced only when the engine is operating at substantially constant speed. The output of the gate 11 is supplied to an indicator 12 for indicating the state of the catalytic converter 1.

In a possible modification, the multiplier 6 is omitted and the integrator 7 integrates the temperature difference with respect to time. FIG. 9 and 10 provide a comparison of this technique and the previously described technique of integrating the heat flow difference, respectively, for five different converters with the curves being labelled in accordance with the state or construction of the respective converter. The broken line curves in FIGS. 9 and 10 represent a blank converter of the type whose operation is illustrated in FIGS. 7 and 8. The other curves represent functional converters subjected to use over 2,000 miles, 67,000 miles, 600 miles on leaded fuel, and 1,800 miles on leaded fuel. The time period illustrated in FIGS. 9 and 10 is the first 600 seconds following starting of the engine from cold and including substantially opened values of engine throttle after approximately 300 seconds.

The curves of FIG. 10 correspond to the curves illustrated in FIGS. 4, 6 and 8 with each curve representing an active converter increasing monotonically without substantial fluctuations whereas the curve for the blank converter extends substantially horizontally. In FIG. 9, the same general trends are apparent for the working converters. However, the curve for the blank converter shows a rising tendency, albeit with a slope substantially less than for any of the working converters. Thus, although the efficiency of operation of the converter can be determined from the integral of temperature differences across the catalytic converter, the integral of heat differences across the converter provides a more sensitive measurement of efficiency which is more immune from the effects of changes or variations in engine operation.

We claim:

1. An apparatus for monitoring operation of a catalytic converter for exhaust gas of an internal combustion engine, said apparatus comprising a first temperature sensor for measuring entry temperature of the exhaust gas entering the converter, a second temperature sensor for measuring exit temperature of the exhaust gas leaving the converter, differencing means responsive to said first and second temperature sensors for forming a difference between the exit temperature and the entry temperature, determining means for determining a rate of mass flow of the exhaust gas, a multiplier responsive to said differencing means and said determining means for forming a product of the difference and the rate of mass flow of the exhaust gas, and processing means responsive to said multiplier for processing the product to provide a measure of operation of the converter, said processing means having a transfer function including an integral term.

2. The apparatus as claimed in claim 1, in which said processing means comprises an integrator.

3. The apparatus as claimed in claim 1, in which said processing means comprises a low pass filter.

4. The apparatus as claimed in claim 1, further comprising a comparator for comparing the measure of converter operation with a threshold.

5. The apparatus as claimed in claim 1, further comprising enabling means for enabling the monitoring of the operation of the converter only during predetermined operational modes of the engine.

6. The apparatus as claimed in claim 5, in which said enabling means enables the monitoring of the operation of the converter only when temperature of the engine is greater than a predetermined temperature.

7. The apparatus as claimed in claim 5, in which said enabling means enables the monitoring of the operation of the converter only at substantially constant engine speed.

8. A method for monitoring operation of a catalytic converter for exhaust gas of an internal combustion engine, said method comprising the steps of:
measuring an entry temperature of the exhaust gas entering the converter;

measuring an exit temperature of the exhaust gas leaving the converter;

forming a difference between the exit temperature and the entry temperature;

multiplying the difference by a rate of mass flow of the exhaust gas to form a product; and subjecting the product to processing by a transfer function having an integral term to provide a measure of converter operation.

9. The method as claimed in claim 8, in which said processing step comprises performing an integration.

10. The method as claimed in claim 8, in which said processing step comprises performing low pass filtering.

11. The method as claimed in claim 8, further comprising comparing the measure of operation of the converter with a threshold.

12. The method as claimed in claim 8, further comprising enabling monitoring of the converter only during predetermined operational modes of the engine.

13. The method as claimed in claim 12, in which said enabling comprises enabling the monitoring only when a temperature of the engine is greater than a predetermined temperature.

14. The method as claimed in claim 12, in which said enabling comprises enabling the monitoring only at substantially constant speed of the engine.

* * * * *